United States Patent [19]

Billenstein et al.

[11] 4,431,565

[45] Feb. 14, 1984

[54] NEW SURFACE-ACTIVE COMPOUNDS, A PROCESS FOR THEIR PREPARATION AND THEIR USE

[75] Inventors: Siegfried Billenstein; Hildegard Freundl, both of Burgkirchen; Ignaz Wimmer, Unterau; Fritz J. Gohlke; Johannes Macenka, both of Burgkirchen, all of Fed. Rep. of Germany

[73] Assignee: Hoechst Aktiengesellschaft, Fed. Rep. of Germany

[21] Appl. No.: 436,329

[22] Filed: Oct. 25, 1982

[30] Foreign Application Priority Data

Oct. 29, 1981 [DE] Fed. Rep. of Germany ....... 3142955

[51] Int. Cl.$^3$ .................. B01D 17/04; C08L 61/14
[52] U.S. Cl. .................. 252/331; 252/358; 525/503; 525/507
[58] Field of Search .................. 525/503, 501, 507; 252/331, 358; 526/911

[56] References Cited

U.S. PATENT DOCUMENTS

| | | | |
|---|---|---|---|
| 2,695,891 | 11/1954 | De Groote | 525/503 |
| 2,885,367 | 5/1959 | Case | 252/331 |
| 3,036,130 | 5/1962 | Jackson et al. | 252/351 |
| 4,117,031 | 9/1978 | Macenta et al. | 252/331 |
| 4,183,821 | 1/1980 | Langdon et al. | 252/331 |

*Primary Examiner*—Theodore E. Pertilla
*Attorney, Agent, or Firm*—Connolly and Hutz

[57] ABSTRACT

The new compounds consist essentially of ethylene oxide/propylene oxide block polymer units and oxyalkyleneated alkylphenol/aldehyde resin units, which are linked by methylene groups. They are prepared by reacting a block polymer of ethylene oxide and propylene oxide and an oxyalkyleneated alkylphenol/aldehyde resin with formaldehyde. The new compounds constitute especially advantageous breaking agents for petroleum.

13 Claims, No Drawings

NEW SURFACE-ACTIVE COMPOUNDS, A PROCESS FOR THEIR PREPARATION AND THEIR USE

The invention relates to new surface-active compounds. The invention also relates to a process for the preparation of the new compounds and to their use for the separation of aqueous emulsions of organic liquids, in particular for the separation of petroleum emulsions of the water-in-oil type.

Of the many substances described as breaking agents for petroleum emulsions, the following types of compounds in particular have been applied in practice:

1. block polymers of propylene oxide and ethylene oxide, such as are obtained by the addition of ethylene oxide onto polypropylene glycols (U.S. Pat. No. 2,674,619 and German Auslegeschrift No. 1,018,179), 2. alkylphenol resins which are soluble in organic solvents and whose free hydroxyl groups are subsequently reacted with ethylene oxide and/or propylene oxide (U.S. Pat. Nos. 2,499,368, 2,499,370, 2,524,889, 2,560,333 and 2,574,543), 3. reaction products of (a) adducts of mixtures of polyethylene glycols and hydrophobic polyalkylene glycols with diisocyanates, or addition products of ethylene oxide and water-insoluble polyalkylene glycols, and (b) condensation products of difunctional monoalkylphenols possessing linear or branched alkyl groups having 1 to 24 carbon atoms in the ortho-position and para-position, with aldehydes, in the molar ratio 0.5:2, preferably 0.9 to 1.1, whose free hydroxyl groups have been further reacted with epoxides, 2 to 20 moles of epoxide being used per OH equivalent of the resin, with (c) diisocyanates (German Pat. No. 1,642,825), and 4. etherified phenol/aldehyde condensation products which are obtained by condensing (a) an addition product which has been obtained by reacting aliphatic aldehydes with phenol in the molar ratio 1:1 to 3:1, at temperatures of 50° to 80° C., in the presence of an alkaline catalyst, with (b) a block polymer which has been prepared by reacting polypropylene glycols having molecular weights of 1,500 to 2,500, with 30 to 50% by weight of ethylene oxide, in the presence of alkaline catalysts, in the ratio of 0.5 to 4 moles of (a) to 1 mole of (b), after prior neutralization, at 80° to 150° C., and removing the water of reaction formed (German Pat. No. 2,445,873).

The abovementioned compounds leave something to be desired in respect of surface-active properties, especially when they are used as breaking agents for petroleum. They always only partially meet the present requirements. Either is, in spite of a spontaneous initial breaking the total separation rather poor and the removal of salt mediocre, or the breaking process proceeds too slowly, even though the separation of salt and water is good. Sometimes, their use is also specifically associated with only a few types of oil, or it is necessary to use relatively large amounts, or they are only effective at elevated temperature.

On the other hand, German Offenlegungsschrift No. 2,536,121 describes polyformaldehyde acetal and polycarbonate copolymers which are obtained by reacting alkylene oxide polymers or alkylene oxide copolymers with formaldehyde or dialkyl carbonate. Possible uses which are mentioned for these surfactants are an antifoam agents, as wetting agents in the manufacture of paper and as lubricants in the textile industry. The possibility of use as emulsion-breaking agents is neither mentioned nor suggested.

The object of the present invention is thus to prepare new surface-active compounds, in particular breaking agents for petroleum emulsions, which do not have the abovementioned shortcomings and are particularly distinguished in that only small amounts are required for a high efficacy, even at a low petroleum processing temperature.

It has now been found, surprisingly, that, by reaction of (a) block polymers of propylene oxide and ethylene oxide and (b) oxyalkyleneated and alkylphenol/aldehyde resins with (c) formaldehyde, new surface-active compounds are obtained which are particularly suitable for the breaking of petroleum emulsions of the water-in-oil type.

The new compounds according to the invention have been prepared by reacting (a) a block polymer of propylene oxide and ethylene oxide, having an average molecular weight of 1,650 to 7,000 and containing 10 to 50% by weight of ethylene oxide units and 50 to 90% by weight of propylene oxide units, relative to the block polymer, and (b) an oxyalkyleneated alkylphenol/aldehyde resin which has been prepared by reaction of para-alkylphenols and/or ortho-alkylphenols having 1 to 18 carbon atoms in the alkyl group, with an aliphatic aldehyde having 1 to 4 carbon atoms, in the molar ratio 1:0.5 to 2, and oxyethyleneation and/or oxypropyleneation of the reaction product with 1 to 40 moles of epoxide per phenolic hydroxyl group, with (c) formaldehyde, component (a) being used in an amount of 1 to 100 parts by weight, relative to one part by weight of component (b), and the formaldehyde being used in a 0.5-fold to 2-fold stoichiometric amount, relative to the amount of hydroxyl groups in (a) and (b), and the reaction being carried out in the presence of acid catalysts, at a temperature of 50° to 180° C.

The compounds (a) and (b) to be used in the present invention, and their preparation, are known, for example from the publications mentioned in the introduction.

Preferably, the ethylene oxide/propylene oxide block polymers to be used according to the invention have an average molecular weight of 1,900 to 3,800, an ethylene oxide content of 10 to 30% by weight and a propylene oxide content of 70 to 90% by weight, the percentages by weight being in each case relative to the block polymer.

Compound (a) is preferably prepared by starting from a polypropylene glycol having an average molecular weight of about 1,500 to 3,500, preferably of about 1,700 to 2,500, onto which ethylene oxide is added, in the presence of alkaline catalysts, preferably potassium hydroxide, sodium hydroxide and/or sodium methylate, until the desired ethylene oxide/propylene oxide block polymer is obtained, whereat after completion of the adduct formation the catalyst may remain in the product, may be neutralized or may be separated off by filtration or ion exchange. In this procedure, the said polypropylene glycols are thus reacted with an amount of ethylene oxide such that 10 to 50% by weight, preferably 10 to 30% by weight, of ethylene oxide is present in the final block polymer (the propylene oxide content is 60 to 90% by weight, preferably 70 to 90% by weight).

To prepare component (b), i.e. the oxyalkyleneated alkylphenol/aldehyde resin, a difunctional para-alkylphenol or ortho-alkylphenol having 1 to 18 carbon atoms per alkyl group, preferably having 4 to 12 carbon atoms per alkyl group, or mixtures thereof, and an aliphatic aldehyde having 1 to 4 carbon atoms, preferably formaldehyde, are used in amounts of 1 mole of alkylphenol compound and 0.5 to 2 moles of aldehyde, preferably 0.8 to 1.3 moles of aldehyde.

Examples of suitable alkylphenols are ortho-cresol or para-cresol, ortho-(secondary butyl)-phenol or para-(secondary butyl)-phenol, ortho-(tertiary butyl)-phenol or para-(tertiary butyl)-phenol, ortho-amylphenol or para-amylphenol, ortho-octylphenol or para-octylphenol, ortho-nonylphenol or para-nonylphenol and ortho-dodecylphenol or para-dodecylphenol.

The alkylphenols to be used according to the invention can contain small amounts, advantageously up to about 10% by weight, of dialkylphenols.

The reaction of alkylphenol and aldehyde is advantageously carried out by heating the two components to a temperature of 90° to 180° C., preferably 100° to 160° C., in the presence of alkaline catalysts, for example alkali metal hydroxides or alkylamines, or in the presence of acid catalysts, for example inorganic or organic acids, such as hydrochloric acid, sulfuric acid, phosphorus-containing acids, sulfonic acids, sulfamic acids or halogenoacetic acids, and in the presence of an organic solvent forming an azeotrope with water, for example toluene, xylene, higher aromatics or mixtures thereof, the water of reaction formed being removed during the reaction by azeotropic distillation. It is preferred to carry out the reaction under acid catalysis. Ethylene oxide, propylene oxide or both ethylene oxide and propylene oxide are then added onto the alkylphenol/aldehyde resin. For this purpose, the alkylphenol/aldehyde resin is reacted with the corresponding amounts of the said epoxides, if appropriate using an organic solvent, such as benzene, toluene, xylene or benzine, advantageously in an autoclave at a temperature of 100° to 180° C., preferably of 120° to 160° C. The oxyethyleneation and/or oxypropyleneation is preferably carried out in an alkaline medium. For this purpose, the alkylphenol/aldehyde resin is first neutralized, if it has been prepared in the presence of acid catalysts, and treated with a catalytic amount of alkaline catalysts. It can be advantageous also to mix additional alkaline catalysts with the alkylphenol/aldehyde resin prepared under alkaline catalysis, in order to ensure alkaline catalysis in the subsequent epoxidation. The reaction of the alkylphenol/aldehyde resin with ethylene oxide and/or propylene oxide can be followed by the drop in the initially prevailing pressure or by the consumption of epoxide.

The epoxidized and, if appropriate, neutralized alkylphenol/aldehyde resin thus obtained is the compound (b) to be used according to the invention. It contains 1 to 40 moles of epoxide, preferably 2 to 20 moles of epoxide, per phenolic hydroxyl group, i.e. per hydroxyl equivalent of the alkylphenol/aldehyde resin.

The compounds according to the invention are prepared by reacting 1 to 100 parts by weight, preferably 10 to 40 parts by weight, of component (a) and 1 part by weight of component (b) with (c), formaldehyde, in a 0.5-fold to 2-fold, preferably 0.8-fold to 1.5-fold, stoichiometric amount, relative to the total hydroxyl groups present (determined as hydroxyl number), in the presence of acid catalysts and at a temperature of 50° to 180° C., preferably 80° to 160° C.

The formaldehyde can be used in the form of paraformaldehyde or in the form of a preferably 20 to 40% strength by weight aqueous solution (formalin). It is also possible to use corresponding amounts of trioxane.

The reaction according to the invention is preferably carried out in such a way that the components (a), (b) and (c) and the catalyst are initially brought together, by themselves (reaction in the absence of a solvent) or with a solvent, and heated to the temperature indicated, with stirring, the water of reaction formed being removed. The reaction is carried out until no more or virtually no more water of reaction is formed. This is generally the case after 3 to 15 hours.

Inorganic or organic acid catalysts can be used. Examples of suitable catalysts are hydrohalic acids, such as hydrochloric acid and hydrobromic acid, phosphorus-containing acids, sulfuric acid, sulfonic acids, such as p-toluenesulfonic acid and dodecylbenzenesulfonic acid, halogenoacetic acids, such as trichloroacetic acid and trifluoroacetic acid, perfluorocarboxylic acids, such as perfluorooctanoic acid, perfluorosulfonic acids, such as perfluorooctanesulfonic acid, and mixtures thereof. Preferred acid catalysts are sulfuric acid, dodecylbenzenesulfonic acid and para-toluenesulfonic acid. The amount of acid catalysts is as a rule 0.05 to 3% by weight, preferably 0.1 to 1.5% by weight, relative to the total weight of the reactants (a), (b) and (c).

The water of reaction formed is removed—if appropriate after precondensation at 80° to 10° C. for 1 to 6 hours—advantageously using a vacuum (water-pump vacuum) or by means of azeotropic distillation with the aid of an organic solvent. Examples of suitable organic solvents are hexane, cyclohexane, toluene, xylene, tetralin, formaldehyde dialkyl acetals having 1 to 4 carbon atoms in the alkyl group, for example formaldehyde dimethyl acetal and formaldehyde dibutyl acetal, or mixtures thereof. Preferred solvents are toluene, xylene, formaldehyde dialkyl acetals having 1 to 4 carbon atoms per alkyl group, or mixtures thereof. The amount of solvent can vary within wide limits. It depends on the amount of compound (a) and compound (b) used.

The reaction product obtained is freed of the solvent used, if appropriate, and neutralized with an amount of alkali corresponding to the acid catalyst used, preferably with sodium methylate solution.

Accordingly, preferred compounds according to the invention are those which have been prepared by reacting (a) a block polymer of propylene oxide and ethylene oxide having an average molecular weight of 1,900 to 3,800 and containing 10 to 30% by weight of ethylene oxide units and 70 to 90% by weight of propylene oxide units, and (b) an oxyalkyleneated alkylphenol/aldehyde resin which has been prepared by reaction of para-alkylphenols and/or ortho-alkylphenols having 4 to 12 carbon atoms in the alkyl group, with formaldehyde, in the molar ratio 1:08 to 1.3, and oxyethyleneation and/or oxypropyleneation of the reaction product with 2 to 20 moles of epoxide per phenolic hydroxyl group, with (c) formaldehyde, component (a) being used in an amount of 10 to 40 parts by weight, relative to one part by weight of component (b), and the formaldehyde being used in a 0.8-fold to 1.5-fold stoichiometric amount, relative to the amount of hydroxyl groups in (a) and (b), and the reaction being carried out in the presence of acid catalysts, at a temperature of 80° to 160° C.

The compounds according to the invention are yellow-colored to brown-colored liquids of greater or lesser viscosity, which are soluble in organic solvents, for example in xylene.

The new compounds are particularly advantageously suitable for the breaking of petroleum emulsions of the water-in-oil type, since they possess, above all, a high efficacy even at relatively low processing temperatures.

In the petroleum processing units, the water-in-oil emulsions are heated to 40° to 70° C., according to their viscosity, and are brought to the acceptance specifications of the refineries by the addition of suitable demulsifiers (breaking agents) or with the aid of a combined electrical-chemical procedure. Because of the persistent need to save energy, more attempts are always being made to lower the processing temperatures which are customary at the present time. However, the consequence of a low processing temperature is that the known types of breaking agents must be introduced in relatively large amounts. Now, it is a fact that the efficacy of a demulsifier in an emulsion is associated with a certain maximum amount. If this amount is exceeded, i.e. if too much demulsifier is provided, the efficacy drops (so-called overtreatment), i.e. only part of the water phase, if any, separates out. It has also been shown that, with the known types of breaking agents, the separation of the formation water does not take place sufficiently rapidly and the content of residual water or residual emulsion present in the crude oil (top oil) is therefore frequently still too large.

The compounds according to the invention are thus distinguished in particular in that, after a short separation time, they produce crude oils meeting the acceptance specifications, even at low processing temperatures, and in that only a relatively small amount is required for this purpose. For this use, it is advantageous to dilute the new products with solvents. Solvents which are advantageously used are alcohols, such as methanol, isopropanol and butanol, aromatic hydrocarbons, such as toluene and xylene, or commercially available solvents, such as mixtures of higher aromatics (solvent naphtha).

The amounts of the compounds according to the invention used as breaking agents for petroleum emulsions can vary within wide limits. As is known, they depend in particular on the type of crude oil emulsion and the processing temperature or on the type of mechanical/physical processing unit.

Accordingly, in the use of the new compounds, according to the invention, for the separation of petroleum emulsions of the water-in-oil type, the compounds are added to the petroleum emulsions in an effective amount in each case. This amount is generally 5 to 100 ppm, preferably 10 to 50 ppm.

The invention is now illustrated in greater detail by means of examples.

Preparation of the compounds according to the invention

EXAMPLE 1

Block polymer (component (a))

Polypropylene glycol having an average molecular weight of 2,000 was reacted, in a known manner, in the presence of alkaline catalysts, with an amount of ethylene oxide such that an adduct having an ethylene oxide content of 20% by weight in the end product was obtained (hydroxyl number: 46).

Alkylphenol/aldehyde resin (component (b))

p-Nonylphenol was reacted, in a known manner, wit an equivalent amount of formalin solution (35% strength by weight) in the presence of catalytic amount of dodecylbenzenesulfonic acid, and the reaction mi> ture was freed of water by azeotropic distillation wit xylene and neutralized. After the addition of catalyti amounts of alkali, this resin was then reacted with a amount of ethylene oxide such that 5 moles of ethylen oxide were used per equivalent of resin, i.e. per phenoli hydroxyl group. A 20% strength by weight xylen solution had a hydroxyl number of 24 and constitute component (b)).

Product according to the invention 280 g of component (a), 79 g of component (b) (corre sponding to a weight ratio a:b, as 100% pure compc nents, of 18:1) and 280 g of formaldehyde di-n-buty acetal were initially brought together with 11.1 g c 35% strength aqueous formalin solution in a stirre flask fitted with a separating head (the 11.1 g corre spond to the stoichiometric amount of formaldehyde relative to the hydroxyl groups present in (a) and (b)) 2.4 g of concentrated sulfuric acid were added (corre sponding to 0.6% by weight of sulfuric acid, relative t the weight of (a) plus (b) plus (c)), with stirring, and th reaction temperature was slowly increased to 160° C the water being separated off. After a total reaction tim of 6 hours, the mixture was cooled to about 50° C. an the formaldehyde di-n-butyl acetal was distilled off a quantitatively as possible under a water-pump vacuun (i.e. about 2,000 Pa), the bottom temperature bein; increased again to 160° C.

After cooling to 100° C., the mixture was neutralize with 10 g of 30% strength sodium methylate solution This gave a brown viscous product soluble in organi solvents (for example xylene).

EXAMPLE 2

540 g of component (a) according to Example 1 an 30 g of a p-nonylphenol/formaldehyde resin oxye thyleneated with 5 moles of ethylene oxide (analo gously to component (b) in Example 1), in the form of 90% strength by weight xylene solution having a hy droxyl number of 107 (weight ratio a:b=20:1), wer mixed together with 20 g of 35% strength aqueou formalin solution (the 20 g corresponds to the 1.1-fok stoichiometric amount of formaldehyde, relative to th hydroxyl groups present in (a) and (b)). After the addi tion of 3.3 g of concentrated sulfuric acid (correspond ing to 0.6% by weight of sulfuric acid, relative to th weight of (a) plus (b) plus (c)), the mixture was stirre for 3 hours at 100° C. and then heated to 140° C. and after this temperature had been reached, a water-pum vacuum was applied. After a condensation time of ( hours at 140° C. had elapsed, the mixture was coole and neutralized, as in Example 1, with Na methylat solution. This gave a brown viscous product soluble ii organic solvents.

EXAMPLE 3

150 g of component (a) according to Example 1, 8.5 of the p-nonylphenol/formaldehyde resin of Example 2 oxyethyleneated with 5 moles of ethylene oxide (90% strength by weight in xylene, hydroxyl number: 107), a: component (b), and 75 g of formaldehyde dibutyl aceta were initially brought together, in a stirred flask, with of paraformaldehyde (corresponding to the 1.3-fold stoichiometric amount of formaldehyde, relative to the hydroxyl groups in (a) and (b)) and 1.7 g (1.1% by weight) of p-toluenesulfonic acid (weight ratio a:b=19.6:1). After stirring for 6 hours at 100° C., the mixture was slowly heated to 140° C. and, after application of a water-pump vacuum, the formaldehyde di-n-butyl acetal and the water of reaction were distilled off. After a total condensation time of 10 hours at 140° C. and under a water-pump vacuum, the mixture was cooled and neutralized, as in Example 1, with sodium methylate solution.

The reaction product was a brown viscous product soluble in organic solvents.

EXAMPLE 4

150 g of component (a) according to Example 1 and 5 parts by weight of the p-nonylphenol/formaldehyde resin of Example 2, oxyethyleneated with 5 moles of ethylene oxide (90% strength by weight in xylene, hydroxyl number: 107), as component (b), were mixed, in a stirred flask, together with 2.5 g of paraformaldehyde corresponding to the 1.1-fold stoichiometric amount of formaldehyde, relative to the hydroxyl groups in (a) and (b)) weight ratio a:b=19.6:1). After the addition of 0.88 g (0.55% by weight) of concentrated sulfuric acid, the mixture was heated slowly to 140° C., with stirring, and stirred for a further 1 hour at this temperature. A water-pump vacuum was then applied and the temperature was kept at 140° C. for a further 4 hours. After this condensation time, the mixture was cooled and neutralized, analogously to Example 1, with sodium methylate solution.

This gave a dark brown, viscous product soluble in organic solvents.

EXAMPLE 5

150 g of component (a) according to Example 1 and 7 g of the p-nonylphenol/formaldehyde resin of Example 2, oxyethyleneated with 5 moles of ethylene oxide (90% strength by weight in xylene, hydroxyl number: 107), as component (b) (corresponding to a weight ratio a:b, as 100% pure components, of 9.8:1), were mixed, in a stirred flask, together with 7.2 g of 35% strength aqueous formalin solution (corresponding to the 1.1-fold stoichiometric amount of formaldehyde, relative to the hydroxyl groups in (a) and (b)). After the addition of 8 g (0.6% by weight) of concentrated sulfuric acid, the mixture was stirred for 2 hours at 100° C. and then heated to 140° C. and kept at this temperature for 1½ hours. A water-pump vacuum was then applied and the temperature was kept at 140° C. for a further 6 hours. After cooling and neutralization with sodium methylate solution, a deep brown, viscous product soluble in organic solvents was obtained.

EXAMPLE 6

250 g of component (a) according to Example 1 and 8 g of a p-tert.-butylphenol/formaldehyde resin oxyethyleneated with 2 moles of ethylene oxide (65% strength in xylene, hydroxyl number: 156), which had been prepared from p-tert.-butylphenol analogously to the oxyethyleneated resin (b) in Example 1, as component (b) (corresponding to a weight ratio a:b, as 100% pure components, of 40:1), were mixed, in a stirred flask, together with 10.8 g of 35% strength aqueous formalin solution (the 10.8 g correspond to the 1.1-fold stoichiometric amount of formaldehyde, relative to the hydroxyl groups present in (a) plus (b)). 1.5 g (0.6% by weight) of concentrated sulfuric acid were added dropwise, with stirring, and the mixture was then kept at 100° C. for 2 hours and then at 140° C. for 1 hour. After application of a water-pump vacuum, the reaction mixture was stirred for a further 3 hours at 140° C.

After cooling, the mixture was neutralized with sodium methylate solution.

The reaction product was a reddish-brown, viscous product soluble in organic solvents.

EXAMPLE 7

150 g of component (a) according to Example 1 and 8.4 g of a p-nonylphenol/formaldehyde resin which had been reacted with 22.6 moles of propylene oxide and then with 10 moles of ethylene oxide (96% strength in xylene, hydroxyl number: 53.8; prepared analogously to the oxyethyleneated resin (b) in Example 1), as component (b) (corresponding to a weight ratio a:b, as 100% pure components, of 18.6:1), were mixed, in a stirred flask, together with 6.2 g of 35% strength aqueous formalin solution (the 6.2 g correspond to the 1.1-fold stoichiometric amount of formaldehyde, relative to the hydroxyl groups in (a) plus (b)). After the addition of 0.8 g (0.5% by weight) of concentrated sulfuric acid, the mixture was condensed for 2 hours at 100° C. and then for 1½ hours at 140° C. A water-pump vacuum was then applied and the temperature was kept at 140° C. for a further 10 hours. After neutralization with Na methylate solution, a dark viscous product soluble in organic solvents was obtained.

EXAMPLE 8

The following were initially introduced into a stirred flask with a separating head:

as component (a): 300 g of a propylene oxide/ethylene oxide block polymer with a polypropylene glycol core having an average molecular weight of 3,200 and with an ethylene oxide content of 45% in the end product, prepared analogously to component (a) in Example 1, as component (b): 19 g of a dodecylphenol/formaldehyde resin which had been reacted with 10 moles of propylene oxide and then with 2 moles of ethylene oxide (50% strength by weight in xylene, hydroxyl number: 28.6; prepared from dodecylphenol from Diamond Shamrock, analogously to the oxyethyleneated resin (b) in Example (1) (corresponding to a weight ratio a:b, as 100% pure components, of 32:1), 250 g of formaldehyde di-n-butyl acetal and 4.5 g of 35% strength aqueous formalin solution (corresponding to the 0.9-fold stoichiometric amount of formaldehyde, relative to the hydroxyl groups in (a) plus (b)).

2.2 g (0.7% by weight) of concentrated sulfuric acid were added to this mixture, with stirring, and the mixture was then heated slowly to 160° C. After the water of reaction had been separated off for 6 hours and after cooling, a water-pump vacuum was applied and the formaldehyde di-n-butyl acetal was distilled off as quantitatively as possible, the bottom temperature being increased again to 160° C. After neutralization with sodium methylate solution, a light brown, viscous product soluble in organic solvents was obtained.

EXAMPLE 9

Polypropylene glycol having an average molecular weight of 1,700 was reacted in a known manner, in the presence of alkaline catalysts, with an amount of ethylene oxide such that an adduct having an ethylene oxide content of 27% by weight in the end product was obtained. This product had a hydroxyl number of 49 and constituted component (a). 230 g of p-nonylphenol were reacted with 43 g of 91% strength paraformaldehyde (i.e. the 1.3-fold stoichiometric amount) in the presence of catalytic amounts of sodium hydroxide. The paraformaldehyde was added in portions. At the end, water of reaction formed was removed by azeotropic distillation with xylene, the mixture being heated to a maximum of 160° C.

Without further addition of alkali, the resulting resin was reacted in a known manner with amounts of ethylene oxide and propylene oxide such that 6.7 moles of ethylene oxide and
6.0 moles of propylene oxide per phenolic hydroxyl group were reacted successively. The resulting 90% strength xylene solution of the resin-/ethylene oxide/propylene oxide block polymer had a hydroxyl number of 66.4 and constituted component (b).

150 g of component (a) and 8.5 g of component (b) (corresponding to a weight ratio of the 100% pure components a:b=20:1) were mixed together with 6.5 g of 35% strength aqueous formalin solution (the 6.5 g correspond to the 1.07-fold stoichiometric amount, relative to the hydroxyl groups present). After the addition of 0.9 g (0.6% by weight) of concentrated sulfuric acid, the mixture was stirred for 2 hours at 100° C. and then heated to 140° C., and a water-pump vacuum was applied. After a condensation time of 6 hours at 140° C. and in vacuo had elapsed, the mixture was cooled and neutralized with sodium methylate solution. The product obtained was a brown viscous liquid soluble in xylene.

EXAMPLE 10

150 g of component (a) of Example 9 were mixed with 8.5 g of the oxyethyleneated p-nonylphenol/formaldehyde resin of Example 1, as component (b) (a:b=20:1), and 6.4 g of 35% strength aqueous formalin solution (the 6.4 g correspond to the stoichiometric amount of formaldehyde, relative to the hydroxyl groups present). After the addition of 0.36 g (0.2% by weight) of concentrated sulfuric acid, the mixture was stirred for 1 hour at 100° C. and then kept for 1 hour at 140° C. After application of a water-pump vacuum, the reaction mixture was stirred for a further 3 hours at 140° C. After cooling, the mixture was neutralized with sodium methylate solution. The end product was a deep brown, viscous liquid soluble in xylene and similar organic solvents.

EXAMPLE 11

150 g of a propylene oxide/ethylene oxide block polymer with a polypropylene glycol core having an average molecular weight of 3,200 and with an ethylene oxide content of 20% by weight in the end product (hydroxyl number: 32, prepared analogously to component (a) in Example 1) were mixed, in a stirred flask, with 8.5 g of the oxyethyleneated p-nonylphenol/formaldehyde resin of Example 2, in the form of a 90% strength by weight xylene solution having a hydroxyl number of 107 (component (b) (a:b=20:1).

After the addition of 4.4 g of 35% strength aqueous formalin solution (corresponding to the stoichiometric amount of formaldehyde, relative to the hydroxyl groups in (a) and (b)) and 0.36 g (0.2% by weight) of concentrated sulfuric acid, the mixture was stirred for 1 hour at 100° C. and then heated to 140° C. and kept at this temperature for 1 hour. After application of a water-pump vacuum, the reaction mixture was stirred for a further 3 hours at 140° C. After cooling and neutralization, a dark brown, viscous product soluble in many organic solvents was obtained.

For reasons of convenience, the calculation, which is in itself known, of the amount of formaldehyde to be used according to the invention is illustrated in greater detail below and shown in Example 1.

With the aid of the hydroxyl number of the components (a) and (b) used, the equation:

$$\frac{(g) \text{ of component } (a) \text{ times hydroxyl number} + (g) \text{ of component } (b) \text{ times hydroxyl number}}{56,100 \ (= \text{molecular weight of KOH times } 1,000)} = x$$

gives, in the value of x, the amount of hydroxyl groups which are present in components (a) and (b).

The amount of formaldehyde stoichiometrically required for x is x/2 moles of formaldehyde, since, as is known, 1 mole of formaldehyde reacts with 2 hydroxyl groups, i.e. 0.5 mole (15 g) of formaldehyde is required for 1 hydroxyl group.

Applied to Example 1, the following is obtained:

$$\frac{280 \cdot 46 + 79 \cdot 24}{56,100} = 0.26$$

0.26/2=0.13 mole of HCHO=0.13·30 g=3.9 g of HCHO.

Since the formaldehyde (HCHO) is used in the form of a 35% strength by weight aqueous solution, (3.9/35)·100 g=11.1 g of this solution are required (cf. Example 1).

Use of the compounds according to the invention as breaking agents for petroleum The following examples with several different crude oil emulsions show that the new breaking agents for petroleum, compared with those according to the state of the art, possess an unexpectedly high efficacy, even at a low processing temperature, in an amount which is independent of the type of crude oil and always relatively small.

EXAMPLE 12

Crude oil from the region immediately north of the Alps

Water content: 50.50%
Salt content: 0.49%
Breaking temperature: 50° C.

| Type of breaking agent | Amount used ppm | Water separated off in % after | | | | | | % of residual water in the top oil |
|---|---|---|---|---|---|---|---|---|
| | | 5' | 15' | 30' | 1h | 3h | 6h | |
| (1) Block polymer according to U.S. Pat. No. 2,674,619 | 50 | 0 | 0 | 6 | 64 | 78 | 78 | 0.8 |
| (2) Resin breaking agent according to U.S. Pat. No. 2,499,368 | 50 | 32 | 76 | 78 | 78 | 80 | 85 | 0.6 |
| (3) Compound of Example 1 of the present Application | 50 | 40 | 98 | 100 | 100 | 100 | 100 | 0.1 |
| Blank value | — | 0 | 0 | 0 | 0 | 2 | 4 | — |
| (1) | 20 | 0 | 0 | 1 | 6 | 34 | 40 | 19.6 |
| (2) | 20 | 0 | 6 | 16 | 36 | 38 | 40 | 18.2 |
| (3) | 20 | 10 | 76 | 92 | 94 | 94 | 96 | 0.3 |
| Blank value | — | 0 | 0 | 0 | 0 | 1 | 3 | — |
| (1) | 10 | 0 | 0 | 0 | 4 | 16 | 20 | >30 |
| (2) | 10 | 0 | 1 | 8 | 18 | 20 | 22 | >30 |
| (3) | 10 | 0 | 1 | 10 | 34 | 50 | 96 | 0.5 |
| Blank value | — | 0 | 0 | 0 | 0 | 0 | 3 | — |
| Breaking temperature 30° C. | | | | | | | | |
| (1) | 50 | 0 | 0 | 0 | 0 | 8 | 20 | 27.7 |
| (2) | 50 | 20 | 40 | 62 | 76 | 78 | 80 | 1.6 |
| (3) | 50 | 4 | 16 | 36 | 80 | 90 | 96 | 0.4 |
| Blank value | | 0 | 0 | 0 | 0 | 0 | 0 | — |
| (1) | 30 | 0 | 0 | 0 | 0 | 4 | 12 | >30 |
| (2) | 30 | 1 | 6 | 22 | 60 | 62 | 64 | 12.8 |
| (3) | 30 | 0 | 6 | 20 | 56 | 84 | 92 | 0.6 |
| Blank value | — | 0 | 0 | 0 | 0 | 0 | 0 | — |

EXAMPLE 13

Crude oil emulsion from the area of Southern Germany
Water content: 51.50%
Salt content: 0.76%
Breaking temperature: 50° C.

EXAMPLE 14

Crude oil emulsion from Lower Saxony
Water content: 42%
Salt content: 10.5%
Breaking temperature: 60° C.

| Type of breaking agent | Amount used ppm | Water separated off in % after | | | | | | % of residual water in the top oil |
|---|---|---|---|---|---|---|---|---|
| | | 5' | 15' | 30' | 1h | 3h | 6h | |
| (1) Resin breaking agent crosslinked according to German Patent 1,642,825 | 30 | 0 | 52 | 64 | 68 | 82 | 88 | 2.8 |
| (2) Crosslinked breaking agent according to German Patent 2,445,873 | 30 | 0 | 50 | 66 | 70 | 84 | 90 | 0.8 |
| (3) Compound of Example 2 of the present Application | 30 | 0 | 52 | 64 | 72 | 84 | 90 | 0.6 |
| Blank value | — | 0 | 0 | 0 | 2 | 2 | 4 | — |
| (1) | 15 | 0 | 1 | 4 | 14 | 40 | 56 | 12.5 |
| (2) | 15 | 0 | 18 | 66 | 72 | 88 | 90 | 0.9 |
| (3) | 15 | 0 | 20 | 64 | 74 | 90 | 94 | 0.7 |
| Blank value | — | 0 | 0 | 0 | 2 | 3 | 3 | — |
| Breaking temperature: 30° C. | | | | | | | | |
| (1) | 100 | 0 | 0 | 1 | 8 | 36 | 82 | 4.5 |
| (2) | 100 | 0 | 0 | 2 | 14 | 60 | 88 | 0.6 |
| (3) | 100 | 0 | 0 | 1 | 12 | 64 | 96 | 0.5 |
| Blank value | — | 0 | 0 | 0 | 0 | 0 | 0 | — |
| (1) | 50 | 0 | 0 | 0 | 4 | 20 | 36 | >30 |
| (2) | 50 | 0 | 0 | 1 | 8 | 32 | 54 | 11 |
| (3) | 50 | 0 | 1 | 6 | 14 | 60 | 94 | 0.4 |
| Blank value | — | 0 | 0 | 0 | 0 | 0 | 0 | — |

| Type of breaking agent | Amount used ppm | Water separated off in % after | | | | | | % of residual water |
|---|---|---|---|---|---|---|---|---|
| | | 5' | 15' | 30' | 1h | 3h | 6h | |
| (1) Block polymer according to U.S. Pat. No. 2,674,619 | 30 | 0 | 0 | 2 | 9 | 20 | 33 | >30 |
| (2) Resin breaking agent according to U.S. Pat. No. 2,449,368 | 30 | 0 | 0 | 0 | 1 | 10 | 14 | >30 |

-continued

| Type of breaking agent | Amount used ppm | Water separated off in % after | | | | | | % of residual water |
|---|---|---|---|---|---|---|---|---|
| | | 5' | 15' | 30' | 1h | 3h | 6h | |
| (3) Compound of Example 3 of the present Application | 30 | 3 | 41 | 82 | 85 | 88 | 90 | 0.8 |
| Blank value | — | 0 | 0 | 0 | 0 | 0 | 2 | — |
| (1) | 15 | 0 | 0 | 0 | 0 | 0 | 0 | >30 |
| (2) | 15 | 0 | 0 | 0 | 0 | 0 | 0 | >30 |
| (3) | 15 | 0 | 7 | 44 | 65 | 75 | 84 | 1.8 |
| Blank value | — | 0 | 0 | 0 | 0 | 0 | 4 | — |
| Breaking temperature: 30° C. | | | | | | | | |
| (1) | 100 | 0 | 4 | 10 | 22 | 30 | 38 | >30 |
| (2) | 100 | 2 | 12 | 48 | 62 | 80 | 92 | 0.6 |
| (3) | 100 | 2 | 14 | 50 | 66 | 82 | 94 | 0.5 |
| Blank value | — | 0 | 0 | 0 | 0 | 0 | 0 | — |
| (1) | 50 | 0 | 0 | 0 | 0 | 0 | 0 | >30 |
| (2) | 50 | 0 | 8 | 20 | 28 | 36 | 40 | 17.8 |
| (3) | 50 | 0 | 12 | 52 | 64 | 84 | 92 | 0.6 |
| Blank value | — | 0 | 0 | 0 | 0 | 0 | 0 | — |

EXAMPLE 15

Crude oil test emulsion, i.e. a crude oil from the region immediately north of the Alps, which has been adjusted to a water content of 50% and a salt content of 0.25%.
Breaking temperature: 50° C.

EXAMPLE 16

Crude oil emulsion from Saudi Arabia
Water content: 17.5%
Salt content: 12.2%
Breaking temperature: 70° C.

| Type of breaking agent | Amount used ppm | Water separated off in % after | | | | | | | | |
|---|---|---|---|---|---|---|---|---|---|---|
| | | 5' | 10' | 15' | 20' | 30' | 45' | 80' | 90' | 120' |
| (1) Mixture of 150 parts by weight of the block polymer (a) with 8.5 parts by weight of the oxyethyleneated resin of Example 4, i.e. of the products used in Example 4 without reaction with formaldehyde acetal | 10 | 0 | 1 | 1 | 2 | 10 | 16 | 22 | 30 | 44 |
| (2) Compound of Example 4 of the present Application | 10 | 8 | 40 | 68 | 76 | 80 | 86 | 88 | 88 | 90 |
| Blank value | — | 0 | 0 | 0 | 0 | 0 | 0 | 0 | 0 | 0 |
| Crude oil test emulsion as above | | | | | | | | | | |
| Water content: 50% | | | | | | | | | | |
| Salt content: 10% | | | | | | | | | | |
| Breaking temperature: 25° C. | | | | | | | | | | |
| (1) | 20 | 0 | 0 | 0 | 0 | 0 | 0 | 0 | 0 | 0 |
| (2) | 20 | 0 | 3 | 5 | 9 | 17 | 29 | 46 | 63 | 80 |
| Blank value | — | 0 | 0 | 0 | 0 | 0 | 0 | 0 | 0 | 0 |

| Type of breaking agent | Amount used ppm | Water separated off in % after | | | | | | % of residual water in the top oil |
|---|---|---|---|---|---|---|---|---|
| | | 5' | 15' | 30' | 1h | 3h | 6h | |
| (1) Resin breaking agent crosslinked according to German Patent 1,642,825 | 50 | 6 | 14 | 28 | 54 | 75 | 86 | 3.8 |
| (2) Crosslinked breaking agent according to German Patent 2,445,873 | 50 | 10 | 36 | 66 | 84 | 94 | 98 | 0.4 |
| (3) Compound of Example 5 of the present Application | 50 | 12 | 34 | 65 | 84 | 96 | 100 | 0.2 |
| (4) Compound of Example 7 of the present Application | 50 | 8 | 20 | 55 | 88 | 94 | 98 | 0.4 |
| Blank value | — | 0 | 0 | 2 | 2 | 4 | 6 | — |
| (1) | 30 | 2 | 10 | 18 | 34 | 36 | 36 | >30 |
| (2) | 30 | 8 | 25 | 52 | 68 | 74 | 80 | 4.0 |
| (3) | 30 | 10 | 32 | 64 | 80 | 92 | 96 | 0.6 |
| (4) | 30 | 8 | 24 | 56 | 88 | 92 | 98 | 0.4 |

| Type of breaking agent | Amount used ppm | Water separated off in % after | | | | | | % of residual water in the top oil |
|---|---|---|---|---|---|---|---|---|
| | | 5' | 15' | 30' | 1h | 3h | 6h | |
| Blank value | — | 0 | 0 | 0 | 3 | 4 | 4 | — |

EXAMPLE 17

Crude oil emulsion from USSR, Raevska type
Water content: 66%
Salt content: 18%
Breaking temperature: 40° C.

| Type of breaking agent | Amount used ppm | Water separated off in % after | | | | | | % of residual water in the top oil |
|---|---|---|---|---|---|---|---|---|
| | | 5' | 15' | 30' | 1h | 3h | 6h | |
| Block polymer according to U.S. Pat. No. 2,674,619 | 80 | 0 | 28 | 42 | 60 | 88 | 92 | 0.4 |
| Resin breaking agent cross-linked according to German Patent 1,642,825 | 80 | 8 | 40 | 52 | 64 | 90 | 98 | 0.1 |
| Compound of Example 6 of the present Application | 80 | 10 | 36 | 48 | 62 | 88 | 96 | 0.4 |
| Compound of Example 8 of the present Application | 80 | 6 | 30 | 54 | 73 | 92 | 98 | 0.2 |
| Blank value | — | 0 | 0 | 2 | 2 | 4 | 6 | — |
| | 40 | 0 | 0 | 7 | 14 | 30 | 45 | >30 |
| | 40 | 2 | 12 | 16 | 20 | 46 | 64 | 13 |
| | 40 | 8 | 36 | 44 | 60 | 88 | 92 | 0.6 |
| | 40 | 4 | 34 | 52 | 74 | 94 | 98 | 0.2 |
| Blank value | — | 0 | 0 | 0 | 1 | 3 | 4 | — |

EXAMPLE 18

Crude oil test emulsion, i.e. a crude oil from the region immediately north of the Alps, which has been adjusted to a water content of 50% and a salt content of 50%.
Breaking temperature: 50° C.

| Type of breaking agent | Amount used ppm | Water separated off in % after | | | | |
|---|---|---|---|---|---|---|
| | | 5' | 15' | 30 | 60' | 120' |
| Block polymer of Example 9 of the present Application | 10 | 0 | 0 | 6 | 28 | 36 |
| Compound of Example 9 of the present Application | 10 | 0 | 1 | 48 | 76 | 78 |
| Compound of Example 11 of the present Application | 10 | 0 | 24 | 68 | 92 | 94 |

We claim:

1. A surface-active compound which has been prepared by reacting
(a) a block polymer of propylene oxide and ethylene oxide, having an average molecular weight of 1,650 to 7,000 and containing 10 to 50% by weight of ethylene oxide units and 50 to 90% by weight of propylene oxide units, the percentages by weight being relative to the block polymer, and
(b) an oxyalkyleneated alkylphenol/aldehyde resin which has been prepared by reaction of para-alkylphenols and/or ortho-alkylphenols having 1 to 18 carbon atoms in the alkyl group, with an aliphatic aldehyde having 1 to 4 carbon atoms, in the molar ratio 1:0.5 to 2, and oxyethyleneation and/or oxypropyleneation of the reaction product with 1 to 40 moles of epoxide per phenolic hydroxyl group, with
(c) formaldehyde,
component (a) being used in an amount of 1 to 100 parts by weight, relative to one part by weight of component (b), and the formaldehyde being used in a 0.5-fold to 2-fold stoichiometric amount, relative to the amount of hydroxyl groups in (a) and (b), and the reaction being carried out in the presence of acid catalysts, at a temperature of 50° to 180° C.

2. A compound as claimed in claim 1, wherein component (a) is a block polymer of propylene oxide and ethylene oxide having an average molecular weight of 1,900 to 3,800 and containing 10 to 30% by weight of ethylene oxide units and 70 to 90% by weight of propylene oxide units, and component (b) is an oxyalkyleneated alkylphenol/aldehyde resin which has been prepared by reaction of para-alkylphenols and/or ortho-alkylphenols having 4 to 12 carbon atoms in the alkyl group, with formaldehyde in the molar ratio 1:0.8 to 1.3, and oxyethyleneation and/or oxypropyleneation of the reaction product with 2 to 20 moles of epoxide per phenolic OH group, and, in the reaction with formaldehyde, component (a) is used in an amount of 10 to 40 parts by weight, relative to one part by weight of component (b), and the formaldehyde is used in a 0.8-fold to 1.5-fold stoichiometric amount, relative to the amount of hydroxyl groups in (a) and (b), and the reaction temperature is 80° to 160° C.

3. A compound as claimed in claim 1, wherein component (a) is a block polymer of propylene oxide and ethylene oxide which has been prepared by adding 10 to 50% by weight of ethylene oxide, relative to the block polymer, onto a polypropylene glycol having an average molecular weight of 1,500 to 3,500, in the presence of alkaline catalysts.

4. A compound as claimed in claim 1, wherein component (b) is an oxyalkyleneated alkylphenol/aldehyde resin which has been prepared by reacting the alkylphenol and the aldehyde at a temperature of 90° to 180° C., under acid catalysis, and the oxyethyleneation and/or oxypropyleneation of the alkylphenol/aldehyde resin is carried out at a temperature of 100° to 180° C., under alkaline catalysis.

5. A process for the preparation of a compound as claimed in claim 1, which comprises reacting
- (a) a block polymer of propylene oxide and ethylene oxide, having an average molecular weight of 1,650 to 7,000 and containing 10 to 50% by weight of ethylene oxide units and 50 to 90% by weight of propylene oxide units, the percentages by weight being relative to the block polymer, and
- (b) an oxyalkyleneated alkylphenol/aldehyde resin which has been prepared by reaction of para-alkylphenols and/or ortho-alkylphenols having 1 to 18 carbon atoms in the alkyl group, with an aliphatic aldehyde having 1 to 4 carbon atoms, in the molar ratio 1:0.5 to 2, and oxyethyleneation and/or oxypropyleneation of the reaction product with 1 to 40 moles of epoxide per phenolic hydroxyl group, with
- (c) formaldehyde, component (a) being used in an amount of 1 to 100 parts by weight, relative to one part by weight of component (b), and the formaldehyde being used in a 0.5-fold to 2-fold stoichiometric amount, relative to the amount of hydroxyl groups in (a) and (b), and the reaction being carried out in the presence of acid catalysts, at a temperature of 50° to 180° C.

6. The process as claimed in claim 5, wherein a block polymer of propylene oxide and ethylene oxide having an average molecular weight of 1,900 to 3,800 and containing 10 to 30% by weight of ethylene oxide units and 70 to 90% by weight of propylene oxide units is used as component (a), and an oxyalkyleneated alkylphenol/aldehyde resin which has been prepared by reaction of para-alkylphenols and/or ortho-alkylphenols having 4 to 12 carbon atoms in the alkyl group, with formaldehyde in the molar ratio 1:0.8 to 1.3, and oxyethyleneation and/or oxypropyleneation of the reaction product with 2 to 20 moles of epoxide per phenolic hydroxyl group, is used as component (b), and, in the reaction with formaldehyde, component (a) is used in an amount of 10 to 40 parts by weight, relative to one part by weight of component (b), and the formaldehyde is used in a 0.8-fold to 1.5-fold stoichiometric amount, relative to the amount of hydroxyl groups in (a) and (b), and the reaction is carried out at a temperature of 80° to 160° C.

7. The process as claimed in claim 5, wherein a block polymer of propylene oxide and ethylene oxide which has been prepared by adding 10 to 50% by weight of ethylene oxide, relative to the block polymer, onto a polypropylene glycol having an average molecular weight of 1,500 to 3,500, in the presence of alkaline catalysts, is used as component (a).

8. The process as claimed in claim 5, wherein an oxyalkyleneated alkylphenol/aldehyde resin which has been prepared by reacting the alkylphenol and the aldehyde at a temperature of 90° to 180° C., under acid catalysis, is used as component (b), and the oxyethyleneation and/or oxypropyleneation of the alkylphenol/aldehyde resin is carried out at a temperature of 100° to 180° C., under alkaline catalysis.

9. A process for the separation of petroleum emulsions of the water-in-oil type, which comprises adding an effective amount of a compound as claimed in claim 1 to the petroleum emulsions.

10. The process as claimed in claim 9, wherein the compound is added in an amount of 5 to 100 ppm.

11. A process for the separation of petroleum emulsions of the water-in-oil type, which comprises adding an effective amount of a compound of claim 2 to the petroleum emulsions.

12. A process for the separation of petroleum emulsions of the water-in-oil type, which comprises adding an effective amount of a compound of claim 3 to the petroleum emulsions.

13. A process for the separation of petroleum emulsions of the water-in-oil type, which comprises adding an effective amount of a compound of claim 4 to the petroleum emulsions.

* * * * *